US008265305B2

(12) United States Patent
Aoki

(10) Patent No.: US 8,265,305 B2
(45) Date of Patent: Sep. 11, 2012

(54) AUDIO SYSTEM

(75) Inventor: Takamitsu Aoki, Hamamatsu (JP)

(73) Assignee: Yamaha Corporation, Hamamatusu-Shi, Shizuoka-Ken (JP)

( * ) Notice: Subject to any disclaimer, the term of this patent is extended or adjusted under 35 U.S.C. 154(b) by 242 days.

(21) Appl. No.: 12/842,647

(22) Filed: Jul. 23, 2010

(65) Prior Publication Data

US 2011/0019842 A1 Jan. 27, 2011

(30) Foreign Application Priority Data

Jul. 24, 2009 (JP) ................................ 2009-173214

(51) Int. Cl.
*H04B 1/00* (2006.01)

(52) U.S. Cl. .......................... 381/123; 381/119; 700/94

(58) Field of Classification Search .................... 381/77, 381/79, 80, 81, 119, 102–109, 123; 700/20, 700/94; 84/615, 660; 370/222, 474, 477, 370/389; 704/500; 369/4
See application file for complete search history.

(56) References Cited

U.S. PATENT DOCUMENTS

| | | | | |
|---|---|---|---|---|
| 5,548,592 | A * | 8/1996 | Komarek et al. | 370/271 |
| 2007/0025568 | A1 * | 2/2007 | Aiso et al. | 381/119 |
| 2007/0142944 | A1 * | 6/2007 | Goldberg et al. | 700/94 |
| 2007/0230462 | A1 * | 10/2007 | Nakayama | 370/389 |

FOREIGN PATENT DOCUMENTS

| | | |
|---|---|---|
| JP | 2007-043249 | 2/2007 |
| JP | 2007-295551 | 11/2007 |
| JP | 4052072 | 12/2007 |

* cited by examiner

*Primary Examiner* — Vivian Chin
*Assistant Examiner* — Friedrich W Fahnert
(74) *Attorney, Agent, or Firm* — Morrison & Foerster LLP

(57) ABSTRACT

In an audio system, a control device includes a setting part that sets automatic compensation of each of a plurality of input ports of the input device into either ON state or OFF state and an adjusting part that adjusts an analog gain of each of the plurality of input ports. The input device includes the plurality of input ports, each input port including an amplifier that controls a level of an analog signal input to the input port based on the analog gain adjusted by the adjusting part, an AD converter that converts the analog signal from the amplifier into a digital signal, a compensator that controls a level of the digital signal from the AD converter based on a digital gain of the input port, and a selector that selects one of the digital signal from the AD converter and the digital signal from the compensator. when the automatic compensation of an input port of the input device is set into the ON state from the OFF state by the setting part of the control device, the digital gain of the input port varies in accordance with the analog gain of the input port so that a value change in the analog gain of the input port by the adjusting part is compensated by a value change in the digital gain of the input channel.

5 Claims, 7 Drawing Sheets

AUDIO SYSTEM

BACKGROUND OF THE INVENTION

1. Technical Field of the Invention

The present invention relates to an audio system constructed by connecting a plurality of devices to an audio network.

2. Description of the Related Art

A mixing system, which is constructed by connecting a plurality of mixing devices in parallel to one input device to which an audio signal is input, is known in the art. The gain of the audio signal input to the input device is adjusted through an adjustment part and the adjusted audio signal is provided in parallel to all mixing devices connected to the input device. One mixing device receives the amount by which the gain has been adjusted by the adjustment part of the input device and corrects the level of the audio signal provided from the input device based on the received amount of adjustment so as to cancel the amount of adjustment of gain in the input device. Accordingly, even when gain adjustment, which is not necessarily optimal for each individual mixing device, has been performed in the input device, the gain adjustment is automatically canceled in the individual mixing device.

A digital mixer having an automatic gain compensation function is also known in the art. The level of an analog signal input to an analog input port in this digital mixer is adjusted through an amplifier whose analog gain is variable and the analog signal is then converted into a digital signal through an A/D converter. The digital signal from the input port is input to an input channel through an input patch and the level of the digital signal is adjusted through an attenuator whose digital gain is variable and acoustic characteristics thereof are then adjusted through an equalizer, a compressor, a fader, or the like. Then, if the user changes the analog gain of the input port in the case where automatic gain adjustment is set to "on", the digital gain of the attenuator in the input channel of the digital mixer is changed to cancel the change of the analog gain so that the gain is automatically compensated.

A network-type audio system is also known in the art. This network-type audio system is constructed of an audio network including a plurality of devices connected in a loop such that loop transmission is possible between the devices. Partial operations of the mixing system such as an input operation, a mixing operation, and an output operation are assigned respectively to the devices of the network-type audio system such that the devices constitute the single audio system as a whole. In the audio network, an audio signal can be transmitted in real time and a control signal can also be transmitted through the same cable.

RELATED ART REFERENCES

[Patent Reference 1] Japanese Patent No. 4052072

[Patent Reference 2] Japanese Patent Application Publication No. 2007-43249

[Patent Reference 3] Japanese Patent Application Publication No. 2007-295551

Here, it is assumed that the conventional network-type audio system includes an input device having input ports for performing input operations and a mixing device having input channels for performing mixing operations. If the user has changed the analog gain of the input port in the case where the conventional automatic gain compensation function is applied to such a network-type audio system, then the digital gain of the input channel of the mixing device is automatically changed so as to compensate the change of the analog gain. Meanwhile, when an instruction to adjust the analog gain has been issued from a console, the analog gain of the input device is adjusted according to the instruction and the digital gain of the mixing device is automatically adjusted. However, since an audio network is present between the devices, the instruction is not simultaneously received by both the input device and the mixing device, thereby causing a problem in that the timings to change gain at the two devices are different.

SUMMARY OF THE INVENTION

Therefore, it is an object of the invention to provide a network-type audio system which can perform automatic gain control without timing deviation.

To achieve the above object, an audio system of the invention comprises a control device and a plurality of devices being connected to an audio network, the plurality of devices including an input device and a mixing device, wherein the control device controls each of the plurality of devices directly or via the audio network according to manipulation performed by an operator, the control device including a setting part that sets automatic compensation of each of a plurality of input ports of the input device into either ON state or OFF state and an adjusting part that adjusts an analog gain of each of the plurality of input ports, wherein the input device includes the plurality of input ports and a sender, each input port including an amplifier that controls a level of an analog signal input to the input port based on the analog gain adjusted by the adjusting part, an AD converter that converts the analog signal from the amplifier into a digital signal, a compensator that controls a level of the digital signal from the AD converter based on a digital gain of the input port, and a selector that selects one of the digital signal from the AD converter and the digital signal from the compensator, and the sender sending the digital signals selected by the selectors of the plurality of input ports via the audio network, wherein the mixing device includes a receiver that receives the digital signals sent by the input device via the audio network, a plurality of input channels, each of which controls characteristics of each of the digital signals from the receiver, and a mix bus that mixes the digital signals from the plurality of input channels, and wherein, (a) when the automatic compensation of an input port of the input device is set into the ON state from the OFF state by the setting part of the control device, the digital gain of the input port is set to a predetermined value and the selector of the input port selects the digital signal from the compensator, (b) while the automatic compensation of an input port is in the ON state, the digital gain of the input port varies in accordance with the analog gain of the input port so that a value change in the analog gain of the input port by the adjusting part is compensated by a value change in the digital gain of the input channel, and, (c) when the automatic compensation of an input port of the input device is set into the OFF state from the ON state by the setting part, the selector of the input port of the input device selects the digital signal from the AD converter.

Preferably, the control device comprises a console connected to the audio network as one of the plurality of devices, the consol having a control panel which is provided thereon with a plurality of controls operable by an operator to control the audio system. Otherwise, the control device comprises a personal computer connected to one of the plurality of devices, the personal computer running thereon a control program for controlling the audio system.

In an expedient form, the audio system may be in combination with another audio system connected to the audio network, wherein said another audio system comprises another control device having the same construction as the control device of the audio system, and another mixing device having the same construction as the mixing device of the audio system, said another mixing device being controlled exclusively by said another control device, wherein the mixing device and the input device of the audio system are controlled exclusively by the control device of the audio system, wherein said another mixing device includes a receiver that receives the digital signals sent by the input device of the audio system via the audio network, a plurality of input channels, each of which controls characteristics of each of the digital signals from the receiver, and a mix bus that mixes the digital signals from the plurality of input channels, and wherein, while the automatic compensation of an input port o the input device of the audio system is in the ON state, the receiver of said another mixing device receives the digital signal having the level which is not changed by the analog gain of the input port adjusted by the adjusting part of the control device of the audio system.

Practically, the audio network is capable of transporting a plurality of audio signals and at least one control signal at the same time between the plurality of devices connected to the audio network.

According to the invention, since a change in the analog gain of the input port is compensated by the digital gain set in the compensator provided in the same input device, it is possible to achieve an automatic gain compensation function of a network-type audio system which can perform automatic gain compensation without timing deviation.

DETAILED DESCRIPTION OF THE INVENTION

Figure 1:
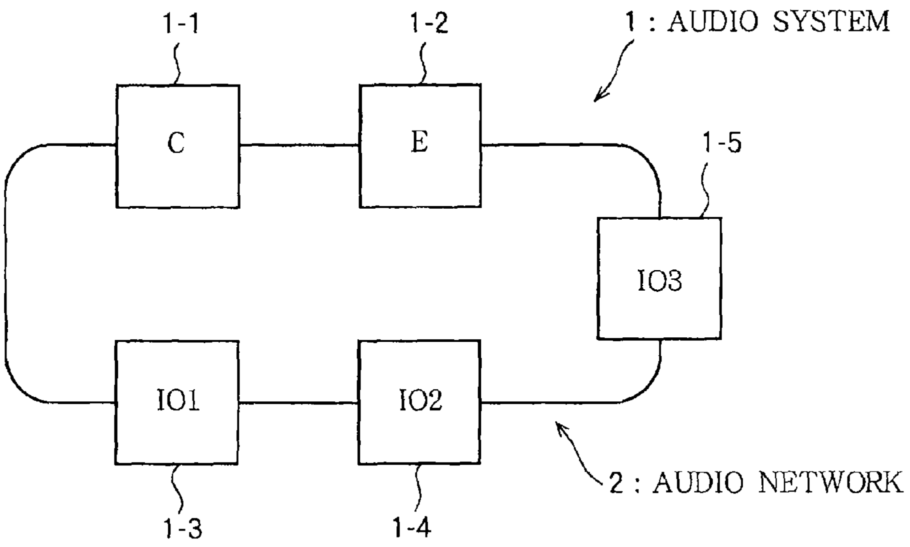
FIG. 1 illustrates an overall configuration of an audio system according to an embodiment of the invention.

FIG. 1 illustrates an overall configuration of an audio system according to an embodiment of the invention.

The audio system 1 shown in FIG. 1 is constructed of an audio network 2, to which devices such as a console (C) 1-1, a mixing engine (E) 1-2, an IO device 1-3 (IO1), an IO device 1-4 (IO2), and an IO device 1-5 (IO3) are connected in a ring, and a ring-shaped transmission path for circulating frames of audio signals is formed on the audio network 2. The devices connected to the audio network 2 are connected to each other through a physical connection cable. Only one of the devices connected to the audio network 2 is a master device and the other devices are slaves. The master device transmits a frame to the ring-shaped transmission path and the transmitted frame circulates in the transmission path, returning to the master node. The frame includes storage regions for a plurality of channels, a channel of a predetermined band is allocated to each of the plurality of devices connected to the audio network 2, and each device can transmit an audio signal to the audio network 2 using the allocated channel. When a device receives an audio signal transmitted from a different device, the device receives the audio signal from a channel allocated to the different device. The frame also includes a storage region for a control signal and thus any device can transmit a control signal to any other device while transmitting an audio signal in the audio network 2. Various types of remote control described later are all performed using communication of this control signal. Namely, the audio network 2 is capable of transporting a plurality of audio signals and at least one control signal at the same time between the plurality of devices connected to the audio network 2.

When an analog audio signal is input to an input port of a device connected to the audio network 2, the audio signal input to the input port is received by the mixing engine 1-2 through the audio network 2. The mixing engine 1-2 mixes audio signals after adjusting level or frequency characteristics of the audio signals and outputs a (mixed) audio signal produced by mixing the audio signals to a device including an output port through the audio network 2. A device which has received the mixed signal emits the mixed signal through a speaker or the like after amplification. The operator can allocate an input port of each device to an input channel of the mixing engine 1-2 or can adjust acoustic characteristics of the input channel to a state, in which a played performance is heard optimally, by manipulating a variety of panel controls provided on the console 1-1. The operator can also set an on/off state of automatic compensation described later for each port. The audio system 1, which is a mixing system, is constructed of the audio network 2 to which devices such as the console 1-1, the mixing engine 1-2, and the IO devices IO1 to IO3 are connected in a ring as described above. The console 1-1 may function as a control device of another device and may be connected to any device instead of being connected to the ring-shaped audio network 2.

Figure 2:
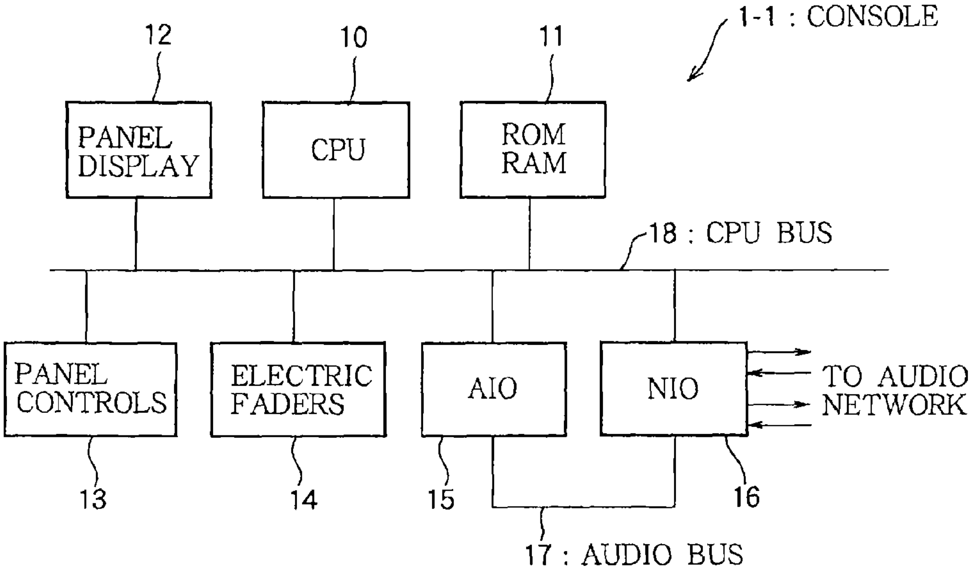
FIG. 2 is a block diagram illustrating a hardware configuration of a console in the audio system of the invention.

FIG. 2 is a block diagram illustrating a hardware configuration of the console 1-1. In the console 1-1 shown in FIG. 2, a Central Processing Unit (CPU) 10 executes an Operating System (OS), which is a management program, and controls the overall operation of the console 1-1 through the OS. The console 1-1 includes a Read Only Memory/Random Access Memory (ROM/RAM) 11 which stores an operation program for the console executed by the CPU 10 and also stores a variety of data and work area data of the CPU 10. A panel display 12 includes a display device such as an LCD and displays a variety of screens such as those for setting a variety of parameters. The panel controls 13 are controls such as faders, knobs, and switches provided on a panel of the console 1-1 and can be operated to change values or on/off states of parameters of the console 1-1, the mixing engine 1-2, or the IO devices. The electric faders 14 are each a fader for adjusting the level or the like of an audio signal of an input channel or an output channel of the console 1-1 and can manually or electrically perform level adjustment. The AIO 15 is an input/output unit for audio signals and includes a plurality of analog input ports, a plurality of analog output ports, and a plurality of bidirectional digital input/output ports. Each of the analog input ports receives and converts an analog audio signal received from the outside into a digital (input) audio signal and sends the digital audio signal to an audio bus 17. Each of the analog output ports receives and converts a digital (output) audio signal from the audio bus 17 into an analog audio signal and outputs the analog audio signal. Each of the digital input/output ports receives a digital (input) audio signal from the outside and sends the digital (input) audio signal to the audio bus 17 and also outputs a digital (output) audio signal received from the audio bus 17. An NIO 16 is a communication interface for connection to the audio network 2 to perform communication. The NIO 16 provides a plurality of (output) audio signals received from the audio network 2 to the analog input ports or the digital input/output ports of the AIO 15 through the audio bus 17 and transmits a plurality of (input) audio signals provided from the analog input ports or the digital input/output ports of the AIO 15 to the audio network 2 through the audio bus 17. Components of the console 1-1 exchange data with each other through a CPU bus 18 including address and data buses and control buses. In short, the console 1-1 is a control device connected to the audio network 2 as one of the plurality of devices, the consol 1-1 having a control panel which is provided thereon with a plurality of controls operable by an operator to control the audio system 1.

Figure 3:
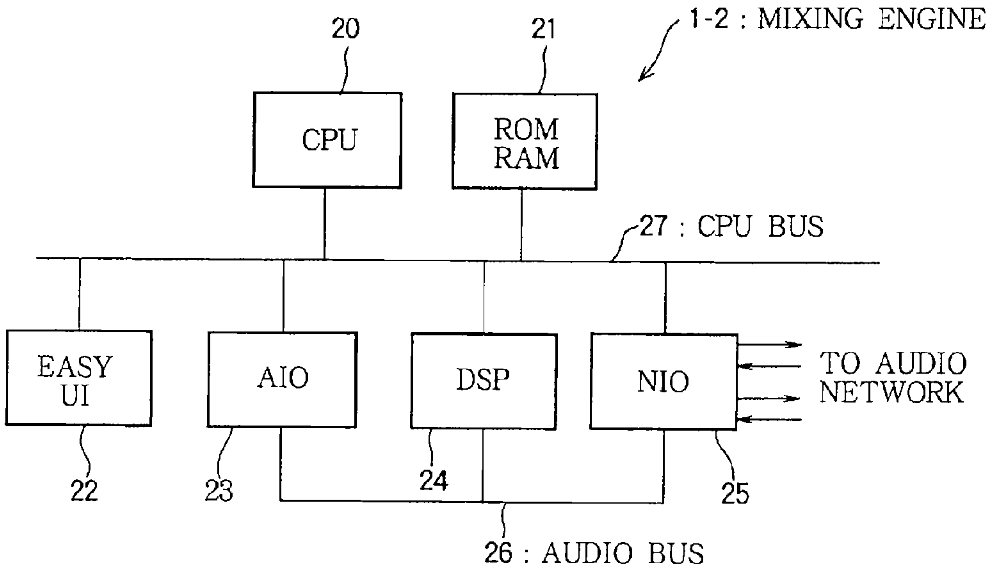
FIG. 3 is a block diagram illustrating a hardware configuration of a mixing engine in the audio system of the invention.

FIG. 3 is a block diagram illustrating a hardware configuration of the mixing engine 1-2 which functions as a mixing device. In the mixing engine 1-2 shown in FIG. 3, a CPU 20 controls the overall operation of the mixing engine 1-2 through an OS. The mixing engine 1-2 includes a ROM/RAM 21 which stores an operation program for the mixing engine executed by the CPU 20 and also stores a variety of data and work area data of the CPU 20. An easy UI 22 is a user interface such as a dial or button for easily performing setting of the mixing engine 1-2. An AIO 23 has the same configuration as the AIO 15 described above and sends a plurality of (input) audio signals input from the outside to the audio bus 26 and also outputs a plurality of (output) audio signals received from the audio bus 26. A Digital Signal Processor (DSP) 24 is a signal processing unit that performs acoustic characteristics control processing and mixing processing according to parameters on a plurality of (input) audio signals which are provided from the AIO 23 or an NIO 25 through an audio bus 26 and that provides a plurality of processed (output) audio signals to the AIO 23 or the NIO 25 through the audio bus. The NIO 25 is a communication interface for connection to the audio network 2 to perform communication. The NIO 25 sends a plurality of (input) audio signals received from the audio network 2 to the audio bus 26 and transmits a plurality of (output) audio signals received from the audio bus 26 to the audio network 2. Components of the mixing engine 1-2 exchange data with each other through a CPU bus 27 including address, data, and control buses.

Figure 4:
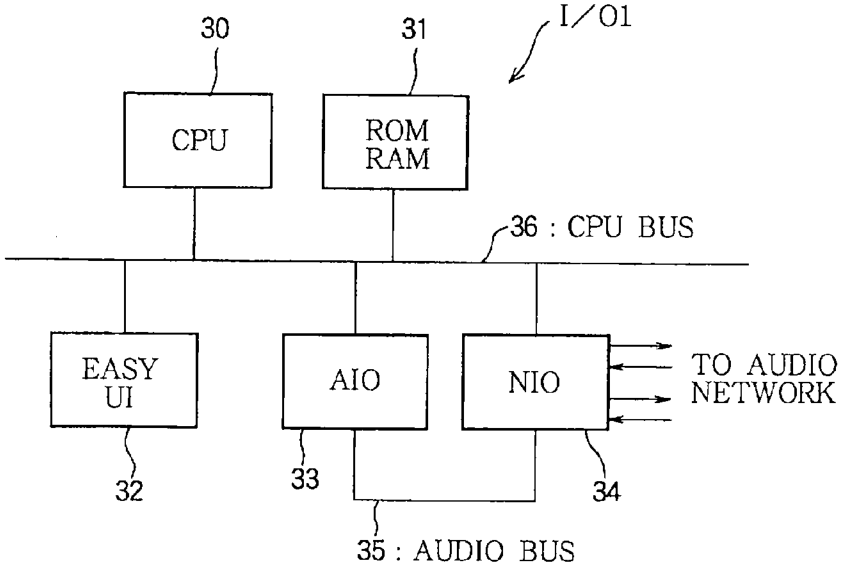
FIG. 4 is a block diagram illustrating a hardware configuration of an IO device in the audio system of the invention.

FIG. 4 is a block diagram illustrating a hardware configuration of the IO device IO1 which is an input device and which is representatively illustrated since the IO devices IO1 to IO3 have the same configuration. In the IO device IO1 shown in FIG. 4, a CPU 30 controls the overall operation of the IO device IO1 through an OS. The IO device IO1 includes a ROM/RAM 31 which stores an operation program for the IO device executed by the CPU 30 and also stores a variety of data and work area data of the CPU 30. An easy UI 32 is a user interface such as a dial or button for easily performing setting of the IO device IO1. An AIO 33 is the same audio signal input/output unit as the AIO 15 described above and an NIO 34 is the same communication interface as the NIO 16 described above. Components of the IO device IO1 exchange data with each other through a CPU bus 36 including address, data, and control buses.

Figure 5:
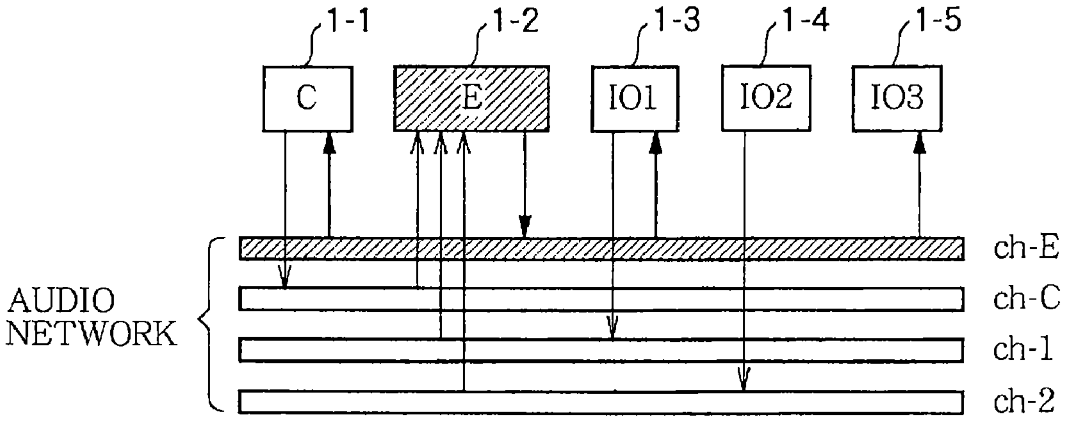
FIG. 5 is an equivalent diagram of connections of audio signals in the audio system of the invention.

FIG. 5 is an equivalent diagram of connections of audio signals in the audio network 2. In FIG. 5, the audio network 2 is illustrated equivalently by buses corresponding to a plurality of channels allocated to devices. In the audio network, since each channel is allocated to only one device and is not simultaneously allocated to another device, an audio signal that a device has transmitted through a channel can be received by any device connected to the network. In FIG. 5, "ch-E" denotes a channel allocated to the mixing engine 1-2, "ch-C" denotes a channel allocated to the console 1-1, "ch-1" denotes a channel allocated to the IO device IO1, and "ch-2" denotes a channel allocated to the IO device IO2. The console 1-1 sends an (input) audio signal, which has been input to an analog input port or a digital input/output port of the console 1-1, to the channel ch-C. The IO device IO1 sends an (input) audio signal, which has been input to an analog input port or a digital input/output port of the IO device IO1, to the channel ch-1. The IO device IO2 sends an (input) audio signal, which has been input to an analog input port or a digital input/output port of the IO device IO2, to the channel ch-2. The mixing engine 1-2 receives a plurality of (input) audio signals from the channels ch-C, ch-1, and ch-2 (while receiving an audio signal from the AIO 23 of the mixing engine 1-2) and performs acoustic characteristics control processing and mixing processing on the received audio signals and then sends a plurality of processed (output) audio signals to the channel ch-E (while outputting the processed audio signals through the AIO 23). The console C receives a plurality of (output) audio signals from the channel ch-E and outputs the audio signals to an external audio device through the analog output ports or the digital input/output ports of the console C. Each of the IO devices IO1 and IO3 also receives a mixed signal from the channel ch-E and outputs the signal to an audio device or a speaker connected to the IO device.

Figure 6:
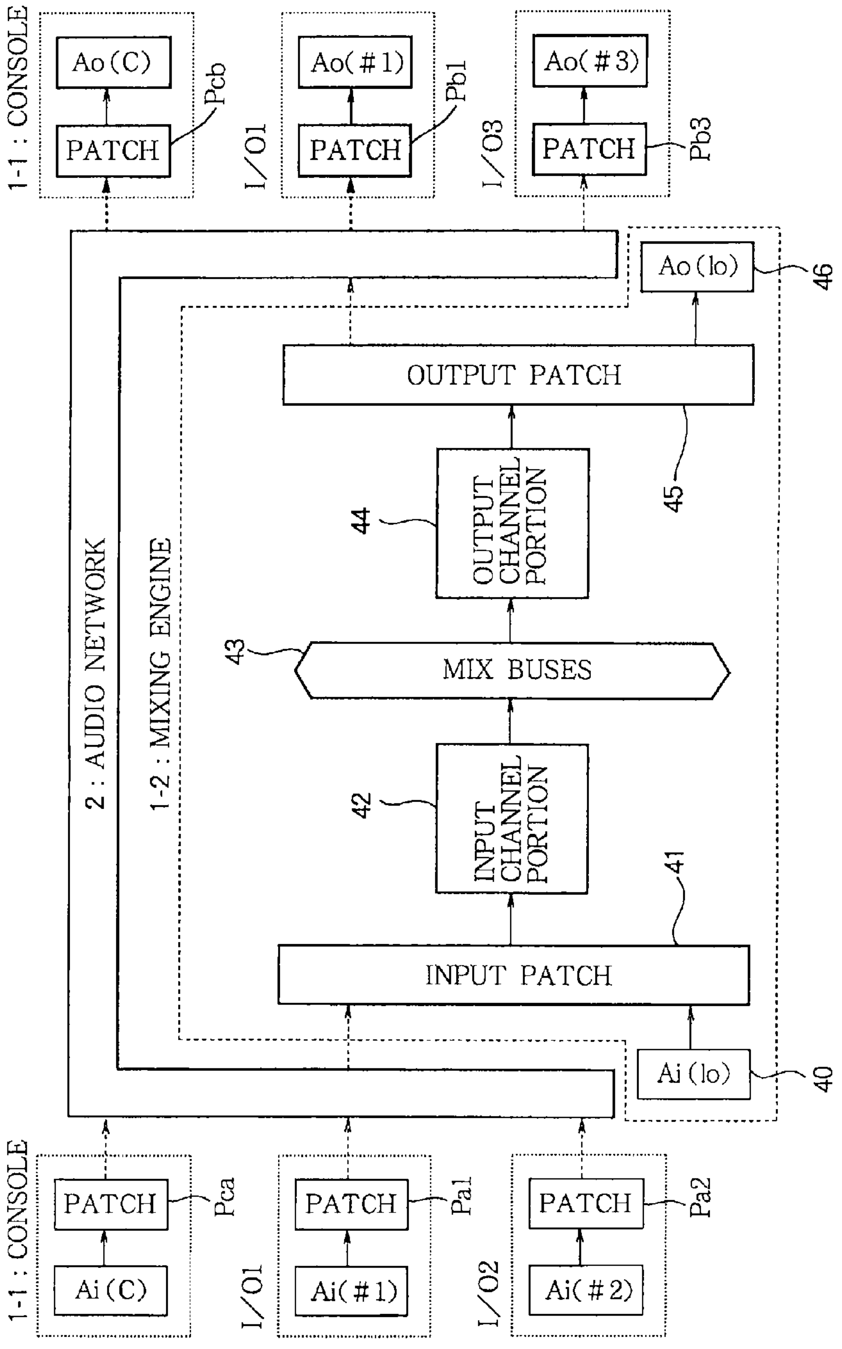
FIG. 6 illustrates flow of signal processing in the audio system of the invention.

FIG. 6 illustrates flow of signal processing associated with the audio system 1.

As shown in FIG. 6, among a plurality of analog or digital input ports Ai(C) included in the AIO 15 of the console 1-1, a plurality of analog or digital input ports Ai(#1) included in the AIO 33 of the IO device IO1, a plurality of analog or digital input ports Ai(#2) included in the AIO of the IO device IO2, a plurality of (input) audio signals from a plurality of desired input ports connected to patches Pca, Pa1, and Pa2 is sent to the audio network 2. The mixing engine 1-2 receives a plurality of desired (input) audio signals among the audio signals received from the audio network 2 and the received audio signals are input to an input patch 41. A plurality of (input) audio signals from analog or digital input ports Ai (Io) 40 included in the AIO 23 of the mixing engine 1-2 are also input to the input patch 41. In the input patch 41, one desired input of the plurality of inputs to the input patch 41 is patched (connected) to each input channel of an input channel portion 42 and an (input) audio signal from the patched input is provided to the input channel. Each input channel of the input channel portion 42 includes an attenuator, an equalizer, and a compressor for adjusting acoustic characteristics. An audio signal of each input channel, whose acoustic characteristics have been adjusted, is sent to mix buses 43 after the send level of thereof at each bus is adjusted through a level adjuster. Each of the m mix buses 43 mixes one or more digital signals, which have been selectively input from input channels. The m mix buses 43 then output a plurality of mixed signals to an output channel portion 44.

Each output channel of the output channel portion 44 also includes an equalizer, a compressor, and the like for adjusting acoustic characteristics and performs frequency balancing or level adjustment and adjusts the sending level of an audio signal to the output patch 45. In the output patch 45, a desired input among a plurality of inputs from the plurality of output channels of the output channel portion 44 is selectively patched to each of a plurality of outputs of the output patch. The plurality of outputs are connected to a plurality of transmission ports, which send a plurality of audio signals to the channel ch-E of the audio network 2, and to a plurality of analog or digital output ports Ao(lo) 46 included in the AIO 23 of the mixing engine 1-2. That is, (output) audio signals from the patched channels are provided to the plurality of output ports Ao(lo) 46 and the plurality of transmission ports. The plurality of output ports Ao(lo) 46 provides the plurality of received (output) audio signals to an external audio device and the plurality of transmission ports sends the plurality of received (output) audio signals to the channel ch-E of the audio network 2.

In the console 1-1, the IO device IO1, and the IO device IO3, a plurality of (output) audio signals are received from the output channels of the mixing engine 1-2 through the audio network and are then input to patches Pcb, Pb1, and Pb3. In the patches Pcb, Pb1, and Pb3, a plurality of (output) audio signals produced through mixing of the output channels are selectively patched to a plurality of analog or digital output ports Ao(C), Ao(#1), and Ao(#3) and are then output from the plurality of output ports Ao(C), Ao(#1), and Ao(#3) to an external audio device.

On the console 1-1, the user can directly or remotely control patching of the patches Pca, Pa1, and Pa2 and the input patch 41 to set patching from desired input ports Ai(C), Ai(#1), and Ai(#2) of the input devices 1-1, 1-3, and 1-4 to desired input channels of the mixing engine 1-2, and can also directly or remotely control patching of the output patch 45 and the patches Pcb, Pb1, and Pb3 to set patching from desired output channels of the mixing engine 1-2 to desired output ports Ao(C), Ao(#1), and Ao(#3) of the output devices 1-1, 1-3, and 1-5 by manipulating the panel display or the panel controls on the console 1-1.

Figure 7:
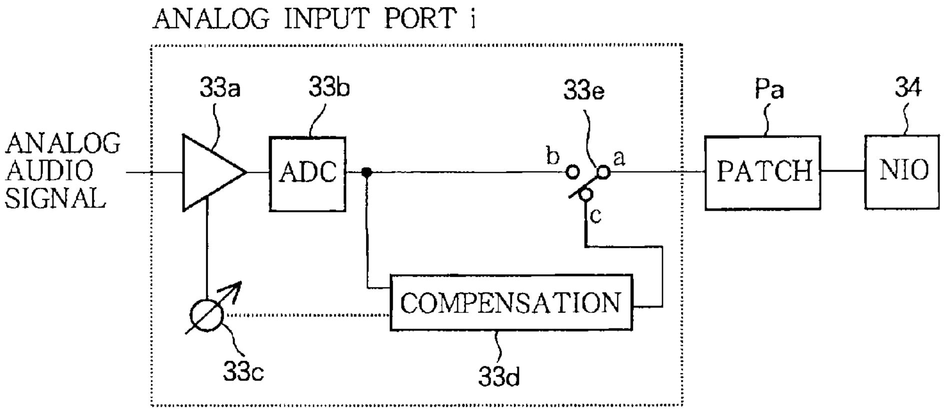
FIG. 7 illustrates details of a transmission path of an audio signal from input of the audio signal to an NIO in an IO device in the audio system of the invention.

FIG. 7 illustrates a detailed configuration of a transmission path of an audio signal from input of the audio signal to the NIO 34 in each of the IO devices IO1 to IO3.

As shown in FIG. 7, an analog audio signal is input to an analog input port i of the IO device and then the IO device converts the analog audio signal into a digital (input) audio signal and outputs the digital (input) audio signal. Here, the IO device includes a plurality of analog input ports and each of a plurality of (input) audio signals from the plurality of ports is transmitted to a desired transmission port of the NIO 34, which has been selectively patched in the patch Pa, using one channel of an audio bus 35. The analog input port i includes an amplifier 33*a*, an AD converter (ADC) 33*b*, a gain adjuster 33*c*, a compensator 33*d*, and a switch 33*e*. The amplifier 33*a* analog-amplifies an analog (input) audio signal received from the outside by a specified analog gain. The gain adjuster 33*c* specifies the analog gain of the amplifier 33*a*. The ADC 33*b* converts an analog audio signal output from the amplifier 33*a* into a digital audio signal. The compensator 33*d* digital-amplifies a digital audio signal from the ADC 33*b* by a specified digital gain and outputs the amplified audio signal. The switch 33*e* selects and outputs one of the digital audio signal from the ADC 33*b* and the digital audio signal from the compensator 33*d*. The bit width of the audio signal output by the ADC 33*b* is 24 bits and the bit width of the audio signal for transmission through the audio network is 32 bits. A head margin of 4 bits is secured among the 32 bits and the gain of the compensator 33*d* can amplify an audio signal up to +24 dB. The change range of the gain of the compensator 33*d* is, for example, −96 dB to +24 dB. When a gain exceeding the change range is specified, the gain of the compensator 33*d* is set to a value within the range closest to the specified gain. The switch 33*e* is switched such that an operating contact a is connected to a fixed contact c when automatic compensation of the analog input port is turned on and is connected to a fixed contact b when automatic compensation is turned off.

Figure 10:
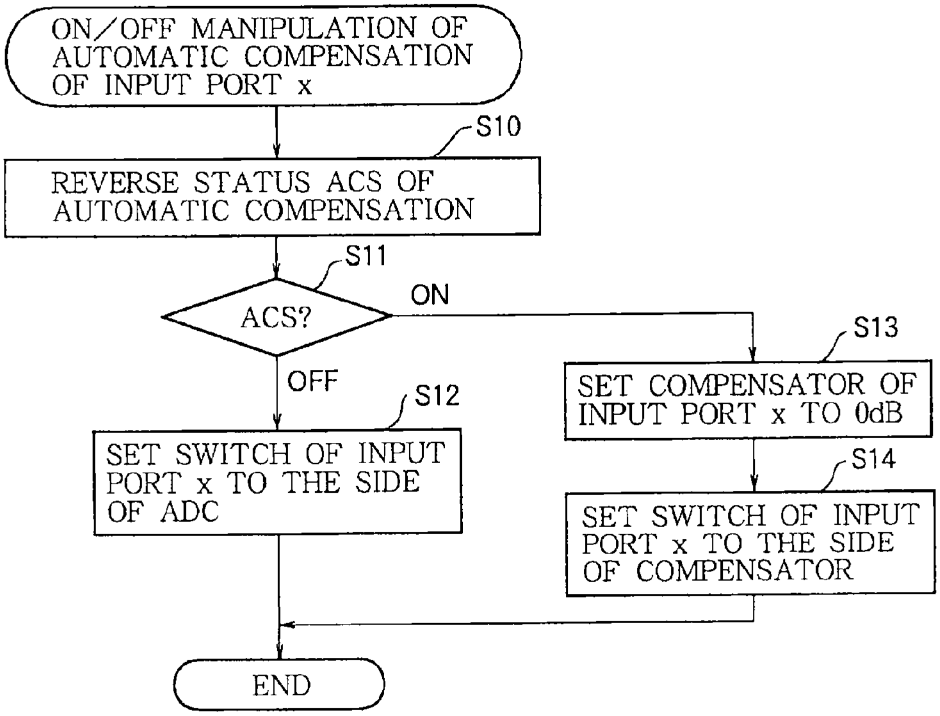
FIG. 10 is a flow chart of an on/off manipulation process of automatic compensation in the audio system of the invention.
Figure 11:
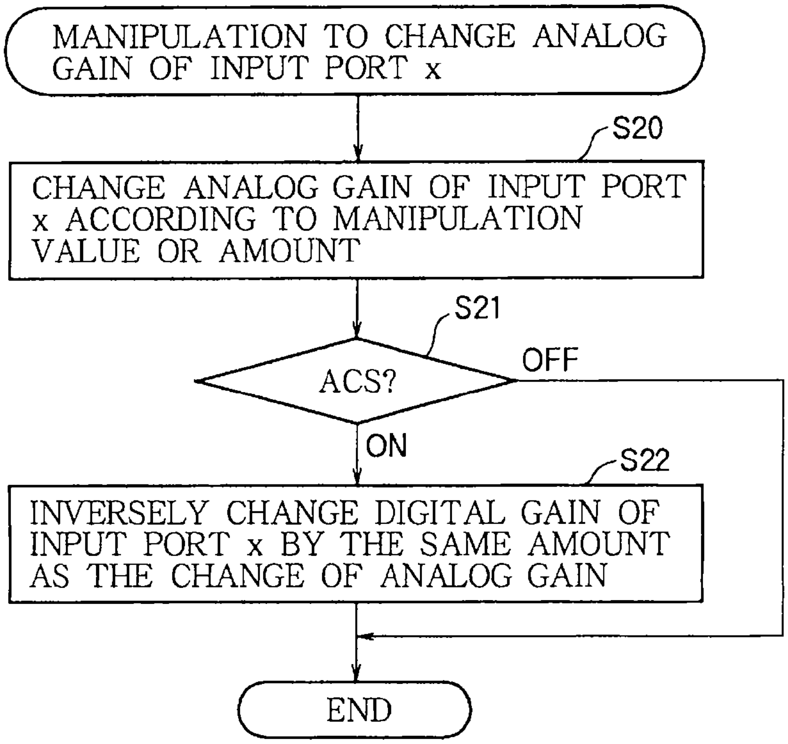
FIG. 11 is a flow chart of an analog gain change process in the audio system of the invention.

The operation of the analog input port i will now be described with reference to FIG. 10 which is a flow chart of an on/off manipulation process of automatic compensation and FIG. 11 which is a flow chart of an automatic compensation process.

When on/off manipulation for automatic compensation of an analog input port i corresponding to an input port x of the device IO1 or IO2 has been performed on the panel of the console 1-1, the console 1-1 transmits a control signal indicating the on/off manipulation to the IO device IO1 or IO2. In the IO device IO1 or IO2, which has received the control signal, the on/off manipulation procedure of automatic compensation shown in FIG. 10 is activated, and a flag ACS indicating the state of automatic compensation of the analog input port i is reversed at step S10. Then, whether the reversed flag ACS indicates an on or off state is determined at step S11. Here, when it is determined that the flag ACS indicates an on state, the procedure proceeds to step S13 to set the digital gain of the compensator 33*d* of the analog input port i to 0 dB. In addition, at step S14, the switch 33*e* is switched to the compensator 33*d* at the fixed contact c. In this case, a digital signal, which has the same level as before automatic compensation is switched to on, is output from the switch 33*e* since the digital gain of the compensator 33*d* is set to 0 dB.

When it is determined that the flag ACS indicates an off state, the procedure proceeds to step S12 to switch the switch 33*e* of the analog input port i to the ADC 33*b* at the fixed contact b.

When the process of step S12 or S14 is terminated, the on/off manipulation procedure of automatic compensation is terminated. The console 1-1 performs the on/off manipulation procedure shown in FIG. 10 when on/off manipulation of automatic compensation of an analog input port i corresponding to an input port x of the console 1-1 has been performed on the panel of the console 1-1.

When a manipulation to change the analog gain (parameter) of the gain adjuster 33*c* of the analog input port i corresponding to the input port x of the IO device IO1 or IO2 has been performed on the console 1-1, the console 1-1 transmits a control signal indicating the change manipulation to the IO device IO1 or IO2. In the IO device IO1 or IO2, which has received the control signal, the analog gain change procedure shown in FIG. 11 is activated and the analog gain (parameter) of the amplifier 33*a* of the analog input port i is changed according to a manipulation value associated with the manipulation or according to the amount of the manipulation at step S20. Then, whether the flag ACS of the input port indicates an on or off state is determined at step S21. Here, when it is determined that the flag ACS indicates an on state, the procedure proceeds to step S22 to change the digital gain of the compensator 33*d* of the analog input port i by an inverse of the amount by which the analog gain has been changed at step S20. Accordingly, the compensator 33*d* outputs an audio signal having a level from which the change of the analog gain by the gain adjuster 33*c* has been canceled (i.e., outputs an audio signal having the same level as the original). That is, even when the operator has manipulated the console 1-1 so that the analog gain of an amplifier 33*a* of an analog input port i has changed, the compensator 33*d* compensates the change of the analog gain, if a flag ACS of the analog input port i is on, and thus the analog input port i outputs an (input) audio signal having the same level as before the manipulation.

On the other hand, when the flag ACS is off, the process of step S22 is not performed and the change of the analog gain by the operator is directly reflected in an (input) audio signal output from the analog input port i. Since on/off of automatic compensation (ACS flag) is set for each analog input port, a common ACS flag is used for a plurality of input channels when the same analog input port has been patched to the plurality of input channels. In addition, on/off of automatic compensation is common to all input channels connected to the same analog input port since on/off of automatic compensation is set for each analog input port. The analog gain change procedure shown in FIG. 11 is performed by the console 1-1 when a manipulation to change the analog gain of the analog input port i corresponding to the input port x of the console 1-1 has been performed on the panel of the console 1-1.

Namely, according to the invention, (a) when the automatic compensation of an input port i of the input device (namely, IO1 or IO2) is set into the ON state from the OFF state by the setting part of the control device (namely, console 1-1), the digital gain of the input port i is set to a predetermined value and the selector 33*e* of the input port i selects the digital signal from the compensator 33*d*, (b) while the automatic compensation of an input port i is in the ON state, the digital gain of the input port i varies in accordance with the analog gain of the input port i so that a value change in the analog gain of the input port i by the adjusting part 33*c* is compensated by a value change in the digital gain of the input channel, and, (c) when the automatic compensation of an input port i of the input device is set into the OFF state from the ON state by the setting part, the selector 33*e* of the input port i of the input device selects the digital signal from the AD converter 33*b*.

Figure 8:
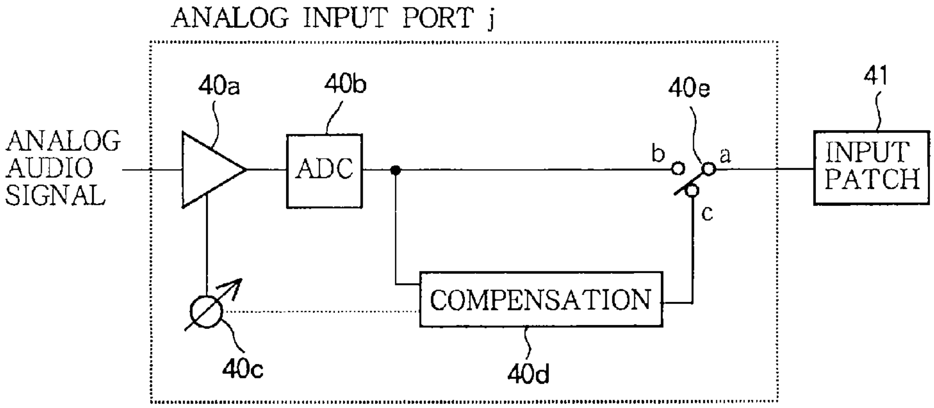
FIG. 8 illustrates details of a transmission path of an audio signal from input of the audio signal to a patch in a mixing engine in the audio system of the invention.

FIG. 8 illustrates a detailed configuration of a transmission path of an audio signal from input of the audio signal to the patch in the mixing engine 1-2.

As shown in FIG. 8, an analog audio signal is input to an analog input port j of the mixing engine 1-2 and then the mixing engine 1-2 converts the analog audio signal into a digital (input) audio signal and outputs the digital (input) audio signal. Here, the mixing engine 1-2 includes a plurality of analog input ports and each of a plurality of (input) audio signals from the plurality of ports is transmitted to a desired channel of the input channel portion 42, which has been selectively patched in the input patch 41, using one channel of the audio bus 26. The analog input port j has the same configuration as the analog input port i of FIG. 7, and blocks 40*a* to 40*e* of the analog input port j operate in the same manner as the corresponding blocks 33*a* to 33*e*. In the procedures of FIGS. 10 and 11, the input port x corresponds to the analog input port j and, even when the operator has changed the analog gain of the amplifier 40*a* remotely from the console 1-1, the change is compensates by the digital gain of the compensator 40*d* and the analog input port j outputs an (input) digital audio signal having the same level as before the change of the analog gain if the ACS flag of the analog input port j is on.

In addition, although not illustrated, a detailed configuration of the transmission path of an audio signal from input of the audio signal to the NIO 16 in the console 1-1 is the same as that of the IO device described above and operation thereof is also the same as that of the IO device described above.

Figure 9:
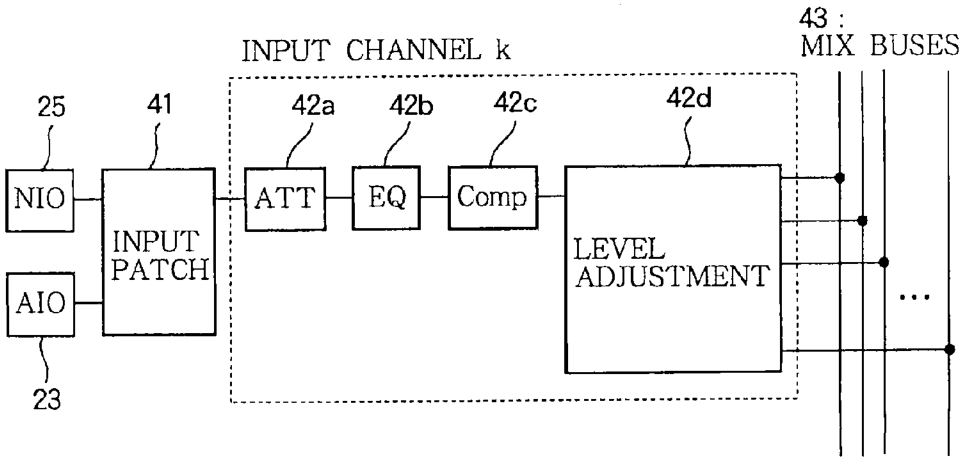
FIG. 9 illustrates details of a transmission path of an audio signal from an NIO or an AIO to mix buses in the mixing engine in the audio system of the invention.

FIG. 9 illustrates a detailed configuration of a transmission path of an audio signal from the NIO 25 or the AIO 23 to the mix buses 43 in the mixing engine 1-2.

A plurality of (input) digital audio signals acquired from the audio network 2 through the NIO 25 or a plurality of (input) digital audio signals input to the AIO 23 are directly input to the input patch 41. On the other hand, each of a plurality of (input) analog audio signals input to the AIO 23 is input to the input patch 41 after being converted into a digital (input) audio signal at the analog input port j shown in FIG. 8. In the input patch 41, one desired input among such a plurality of inputs to the input patch 41 can be selectively patched (connected) to each input channel k of the input channel portion 42. The input channel k includes an attenuator (ATT) 42*a*, an equalizer (EQ) 42*b*, a compressor (Comp) 42*c*, and a level adjuster 42*d*. The attenuator 42*a* adjusts the level of a digital (input) audio signal based on an attenuator parameter. The equalizer 42*b* adjusts frequency characteristics of the same audio signal based on an equalizer parameter. The compressor 42*c* dynamically controls the level of the same audio signal based on a compressor parameter. The level adjuster 42*d* controls the send level of the audio signal for sending to each of the mix buses 43 based on a send parameter corresponding to the mix bus. The input channel k adjusts characteristics of the audio signal through these components. Here, the attenuator parameter of the attenuator 42*a* is a parameter for adjusting the level of an audio signal input to the input channel k to a level suitable for signal processing of the equalizer 42*b* or the compressor 42*c*, independently of digital gain or analog gain of the analog input port i or j. Each of the mix buses 43 receives audio signals, the levels of which have been controlled for input to the mix bus 43, from a plurality of input channels and mixes the received audio signals and outputs the mixed audio signal. In the case of an input channel k patched to an analog input port i or j whose automatic compensation (ACS) is off, the level of an audio signal input to an attenuator 42*a* of the analog input port i or j changes, if the analog gain of the analog input port i or j changes, and therefore the operator should readjust the attenuator parameter. On the other hand, in the case of an input channel k patched to an analog input port i or j whose automatic compensation (ACS) is on, the level of an audio signal input to an attenuator 42*a* of the analog input port i or j does not change due to automatic compensation by the compensator 33*d* or 40*d*, even if the analog gain of the analog input port i or j changes, and thus the operator does not have to readjust the attenuator parameter.

Figure 12:
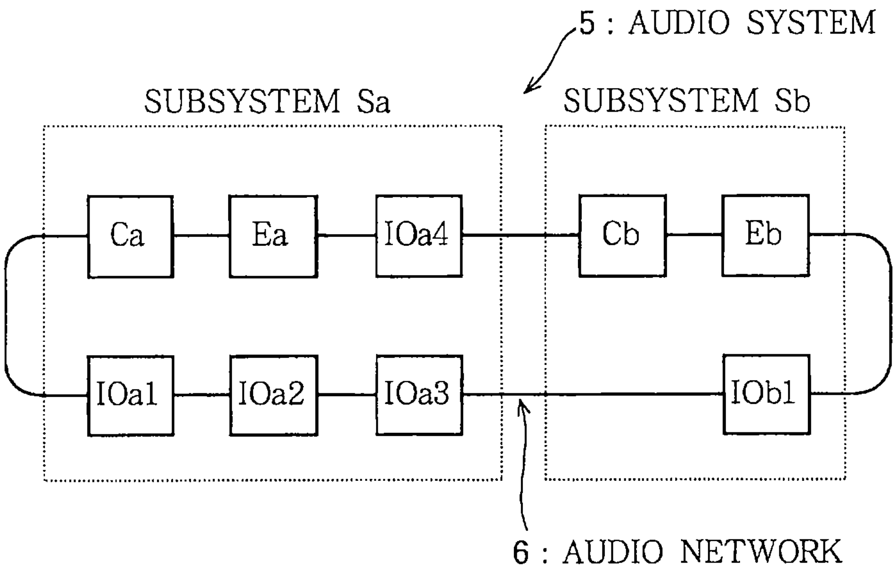
FIG. 12 illustrates an overall configuration of an audio system according to another embodiment of the invention.

FIG. 12 illustrates an overall configuration of an audio system according to another embodiment of the invention.

The audio system 5 of FIG. 12 includes a subsystem Sa and a subsystem Sb which are connected to an audio network 6. The subsystem Sa includes a console Ca, a mixing engine Ea, and four IO devices IOa1, IOa2, IOa3, and IOa4 which are connected to the audio network 6. The subsystem Sb includes a console Cb, a mixing engine Eb, and an IO device IOb1 which are connected to the audio network 6.

One of the nine devices connected to the audio network 6 is a master node. The master device regularly transmits a transmission frame to circulate through the audio network and also allocates a transmission channel to each of the nine devices. In this network, the subsystem Sa and the subsystem Sb can share (input) audio signals since an audio signal written to a transmission frame transmitted by one of the nine devices can be received by other devices. That is, the mixing engine Eb of the subsystem Sb can receive (input) audio signals that the IO devices IOa1, IOa2, IOa3, and IOa4 have transmitted to the audio network 6 and the mixing engine Ea of the subsystem Sa can receive (input) audio signals that the IO device IOb1 has transmitted to the audio network 6.

In the subsystem Sa, the console Ca serves as a control device of the subsystem Sa and remotely controls the mixing engine Ea and the IO devices IOa1, IOa2, IOa3, and IOa4. In the subsystem Sb, the console Cb serves as a control device of the subsystem Sb and remotely controls the mixing engine Eb and the IO device IOb1. The devices of the subsystem Sb cannot be remotely controlled by the console Ca since the devices are not under management by the subsystem Sa and the device of the subsystem Sa cannot be remotely controlled by the console Cb since the device is out of the range of management by the subsystem Sb.

Here, let us consider the case where the mixing engine Eb in the subsystem Sb extracts (input) audio signals, which the IO device IOa2 of the subsystem Sa has received through an analog input port i and has then transmitted to the audio network 6, and patches the extracted audio signals to one input channel k and then performs a mixing process on the audio signals. Here, the analog input port i is under control of the console Ca and the analog gain of the analog input port i is freely changed through panel manipulation by the operator of the subsystem Sa. In the conventional technology (which corresponds to when automatic compensation of the analog input port i of this embodiment is off), since the level of the (input) audio signal of the input channel k of the subsystem Sb changes, the operator of the subsystem Sb should readjust an attenuator parameter of the input channel k which has already been adjusted, thereby complicating the manipulation process. In the invention, by allowing the operator of the subsystem Sb to have the operator of the subsystem Sa turn on automatic compensation of the analog input port i which shares (input) audio signals, the level of an (input) audio signal input to the input channel k is not changed even when the analog gain of the analog input port i has changed and thus the operator of the subsystem Sb does not have to readjust the attenuator parameter.

As described above, audio system Sa is in combination with another audio system Sb connected to the audio network 6. The audio system Sb comprises another control device Cb having the same construction as the control device Ca of the audio system Sa, and another mixing device Eb having the same construction as the mixing device Ea of the audio system Sa, the mixing device Eb being controlled exclusively by the control device Cb. The mixing device Ea and the input device IOa of the audio system Sa are controlled exclusively by the control device Ca of the audio system Sa. The mixing device Eb includes a receiver that receives the digital signals sent by the input device IOa of the audio system Sa via the audio network 6, a plurality of input channels, each of which controls characteristics of each of the digital signals from the receiver, and a mix bus that mixes the digital signals from the plurality of input channels. While the automatic compensation of an input port o the input device IOa of the audio system Sa is in the ON state, the receiver of the mixing device Eb receives the digital signal having the level which is not changed by the analog gain of the input port adjusted by the adjusting part of the control device Ca of the audio system Sa.

In the audio device of the invention described above, if the analog gain of an input port, to which an analog audio signal is input, in an input device has been changed by a console, a digital gain set in a compensator of the input port compensates a change in the analog gain. The compensator adjusts the digital gain of a digital signal into which the input analog signal has been converted and outputs the resulting digital signal from the input port when the automatic gain compensation is on. Accordingly, it is possible to achieve an automatic gain compensation function of a network-type audio system which can perform automatic gain compensation without timing deviation or time lag.

In addition, although a plurality of devices are connected in a ring to the audio network 2, the plurality of devices may also be connected in a different form, for example, in a cascade. Further, although the consoles C, Ca, and Cb operate as control devices in the embodiments of the invention, the control devices are not limited to the consoles. For example, the console of FIG. 2, the mixing engine of FIG. 3, and the IO device of FIG. 4 may be provided with an interface for connection to an external personal computer (PC), a program for controlling the audio system may be activated through an operating system of the PC connected to the interface, and the activated program may operate as a control device of the audio system. Namely, the personal computer serves as the control device connected to one of the plurality of devices, the personal computer running thereon a control program for controlling the audio system.

What is claimed is:

1. An audio system comprising a control device and a plurality of devices being connected to an audio network, the plurality of devices including an input device and a mixing device, wherein the control device controls each of the plurality of devices directly or via the audio network according to manipulation performed by an operator, the control device including a setting part that sets automatic compensation of each of a plurality of input ports of the input device into either ON state or OFF state and an adjusting part that adjusts an analog gain of each of the plurality of input ports, wherein the input device includes the plurality of input ports and a sender, each input port including an amplifier that controls a level of an analog signal input to the input port based on the analog gain adjusted by the adjusting part, an AD converter that converts the analog signal from the amplifier into a digital signal, a compensator that controls a level of the digital signal from the AD converter based on a digital gain of the input port, and a selector that selects one of the digital signal from the AD converter and the digital signal from the compensator, and the sender sending the digital signals selected by the selectors of the plurality of input ports via the audio network, wherein the mixing device includes a receiver that receives the digital signals sent by the input device via the audio network, a plurality of input channels, each of which controls characteristics of each of the digital signals from the receiver, and a mix bus that mixes the digital signals from the plurality of input channels, and wherein, (a) when the automatic compensation of an input port of the input device is set into the ON state from the OFF state by the setting part of the control device, the digital gain of the input port is set to a predetermined value and the selector of the input port selects the digital signal from the compensator, (b) while the automatic compensation of an input port is in the ON state, the digital gain of the input port varies in accordance with the analog gain of the input port so that a value change in the analog gain of the input port by the adjusting part is compensated by a value change in the digital gain of the input channel, and, (c) when the automatic compensation of an input port of the input device is set into the OFF state from the ON state by the setting part, the selector of the input port of the input device selects the digital signal from the AD converter.

2. The audio system according to claim 1, wherein the control device comprises a console connected to the audio network as one of the plurality of devices, the consol having a control panel which is provided thereon with a plurality of controls operable by an operator to control the audio system.

3. The audio system according to claim 1, wherein the control device comprises a personal computer connected to one of the plurality of devices, the personal computer running thereon a control program for controlling the audio system.

4. The audio system according to claim 1, in combination with another audio system connected to the audio network, wherein said another audio system comprises another control device having the same construction as the control device of the audio system, and another mixing device having the same construction as the mixing device of the audio system, said another mixing device being controlled exclusively by said another control device, wherein the mixing device and the input device of the audio system are controlled exclusively by the control device of the audio system, wherein said another mixing device includes a receiver that receives the digital signals sent by the input device of the audio system via the audio network, a plurality of input channels, each of which controls characteristics of each of the digital signals from the receiver, and a mix bus that mixes the digital signals from the plurality of input channels, and wherein, while the automatic compensation of an input port o the input device of the audio system is in the ON state, the receiver of said another mixing device receives the digital signal having the level which is not changed by the analog gain of the input port adjusted by the adjusting part of the control device of the audio system.

5. The audio system according to claim 1, wherein the audio network is capable of transporting a plurality of audio signals and at least one control signal at the same time between the plurality of devices connected to the audio network.

* * * * *